United States Patent [19]
Ryder

[11] Patent Number: 5,890,781
[45] Date of Patent: Apr. 6, 1999

[54] GLOVE BOX

[75] Inventor: Martyn Ryder, Brighouse, England

[73] Assignee: Extract Technology, Ltd, Huddersfield, England

[21] Appl. No.: 102,683

[22] Filed: Jun. 23, 1998

Related U.S. Application Data

[63] Continuation of Ser. No. 735,459, Oct. 23, 1996, abandoned.

[30]     Foreign Application Priority Data

Oct. 25, 1995 [GB] United Kingdom ................... 9521864

[51] Int. Cl.$^6$ ...................................................... B25J 21/02
[52] U.S. Cl. ..................................................... 312/1; 312/3
[58] Field of Search .................................. 312/1, 4, 5, 6; 454/187; 422/104

[56]     References Cited

U.S. PATENT DOCUMENTS

| | | |
|---|---|---|
| 1,670,026 | 5/1928 | De Lano . |
| 2,907,508 | 10/1959 | Pride . |
| 3,059,831 | 10/1962 | Trexler . |
| 3,776,284 | 12/1973 | Guyer et al. . |
| 3,875,927 | 4/1975 | Trexler . |
| 4,026,286 | 5/1977 | Trexler . |
| 4,111,753 | 9/1978 | Folsom et al. . |
| 4,335,712 | 6/1982 | Trexler . |
| 4,566,293 | 1/1986 | Arner et al. . |
| 4,920,768 | 5/1990 | Cares et al. . |
| 4,949,863 | 8/1990 | Cazalis et al. . |
| 4,960,143 | 10/1990 | Dore, Jr. et al. . |
| 5,299,243 | 3/1994 | Picco . |
| 5,562,593 | 10/1996 | Sammel . |

FOREIGN PATENT DOCUMENTS

| | | |
|---|---|---|
| 2631252 | 11/1989 | France . |
| 3046599 | 2/1991 | Japan . |
| 1146767 | 3/1969 | United Kingdom . |
| 2176435 | 12/1986 | United Kingdom . |

OTHER PUBLICATIONS

"Isolab," Science Magazine, p. 14a (Nov. 1965).
"Durability—All Plexiglass* Glove Boxes," Greiner Scientific, p. 15 (Mar. 1965).

*Primary Examiner*—Peter M. Cuomo
*Assistant Examiner*—David E. Allred
*Attorney, Agent, or Firm*—Madson & Metcalf

[57]     ABSTRACT

The glove box (1) comprises a rigid frame (2) for defining the shape of a glove box. The frame has a first hollow face (3) defining a drum receiving portion (4) which is substantially tubular in shape and a second face (4) defining an outlet (5) which is also substantially tubular in shape. The remaining four faces of the frame are open and a flexible glove bag (6) is shaped to fit over the frame covering the open faces (7) and to be sealingly attached to the frame.

15 Claims, 6 Drawing Sheets

GLOVE BOX

This application is a continuation of Ser. No. 08/735,459, filed Oct. 23, 1996, now abandoned.

This invention relates to a glove box, and particularly, but not exclusively, to a portable and/or disposable glove box.

It is often necessary for an operator to handle highly toxic and/or pharmaceutical substances. In such situations, it is vital that the toxic substance-does not come into contact with the operator, nor be released into the environment with possible catastrophic effect.

It is often necessary to handle toxic and/or pharmaceutical substances. For example, such substances are often initially dispensed into drums, and it may then be required to dispense the substance from the drum into smaller containers or to dispose of the substances by emptying the contents into other containers for eventual disposal.

It is known to carry out such operations by placing the drum containing a toxic substance within a pressurised chamber. An operator who is to handle the substance must wear a "space suit" which effectively seals him from his environment completely protecting him from his environment. In order that the operator can breathe within the space suit it is necessary to pipe air into the suit. This means that the operator can hear little if anything which is occurring in his surroundings, and if it is required to communicate with the operator it is necessary to use an intercom system.

It is known that personnel having to wear a "space suit" and work in such a pressurised chamber do not enjoy the experience. An operator in such a situation will tend to feel isolated from his surroundings.

According to a first aspect of the present invention, there is provided a glove box comprising:
 a frame;
 a flexible glove bag sealingly fittable over the frame to form the glove box;
 the frame further comprising a drum receiving portion and an outlet.

According to a second aspect of the present invention there is provided a method of dispensing a substance contained within a drum by means of the glove box-according to the first aspect of the present invention.

The frame defines the shape of the glove box, and once the glove bag has been sealingly fitted over the frame, a sealed area results. The sealed area has first and second apertures, the first aperture defining a drum receiving portion, and the second aperture defining an outlet.

In use, a drum will be sealingly connected to the drum receiving portion, and the outlet will be sealingly attached to collection means for collecting the contents of the drum after it has been dispensed.

The flexible glove bag is shaped to incorporate one or more gloves. The gloves allow an operator to insert one or both of his hands into the one or more gloves in order to carry out operations within the glove bag and to, for example, dispense the contents of the drum in measured amounts from the drum via the outlet into a further container whilst remaining isolated from the harmful contents of the drum.

By means of the present invention therefore it is possible for an operator to handle harmful and/or toxic substances without having to wear a "space suit" of the type described hereinabove.

It is known to use glove boxes to handle harmful and/or toxic substances. However, such known glove boxes are located in a fixed position particularly to allow for laminar air flow to be provided into the glove box. In addition, glove boxes tend to be small typically being approximately 1 m×0.9 m×0.7 m. It is not usually possible therefore to use such a glove box in conjunction with a drum which is usually approximately 0.4 m in diameter and 0.6 m high. This is because known glove boxes do not have, for example, a drum receiving portion. It would be necessary to place the entire drum within a glove box which would result in further operations carried out on the drum being very awkward.

The glove box of the present invention may be of any size but typically defined a cube having sides of approximately 0.5 m in length.

Advantageously the frame is made from a metal such as stainless steel.

The glove box is easily portable, and the frame may be taken to a location where it is required.

The flexible glove bag may be made from any suitable material but conveniently is formed from a plastics material.

Advantageously the plastics material is transparent.

Conveniently, the glove bag is shaped to fit over four faces of the glove box. The remaining two faces of the glove box defining the drum receiving portion and the outlet.

Advantageously the two faces in which the drum receiving portion and the outlet are defined comprise sheets of metal.

Preferably, the drum receiving portion comprises a tubular member extending from a face of the glove box having an open end remote from the glove box and having a diameter compatible with the diameter of a drum to be attached to the glove box.

A drum from which a substance is to be dispensed may thus be sealingly attached to the glove box.

Conveniently, an outer lining is provided which is attachable to an outside surface of the drum receiving portion, and which is adapted to enclose entirely a drum from which a substance is to be dispensed. This means that the entire drum is isolated from its surroundings and reduces still further the chances of contamination.

Advantageously, the drum receiving portion comprises retaining means for retaining the liner in sealing contact with the drum receiving portion.

Preferably, the retaining means comprises one or more grooves formed in an outer surface of the drum receiving portion and positioned towards the open end of the drum receiving portion.

Advantageously, the drum receiving portion comprises two grooves extending circumferentially around the drum receiving portion.

A length of liner may be positioned in each of the grooves and held in place by retaining bands and rolled up or folded up in order that a long length of liner may, be secured by a groove whilst still allowing a drum access to the glove box via the open end of the tubular member.

Preferably the bands are formed from an elastics material. Once the drum is empty, it must be removed from the glove box. The removal will be effected by an operator pushing the drum down the drum receiving portion towards a closed end of the lining at the open end of the tube receiving portion. This force will cause the length of lining to unroll or unravel from the groove in which it is retained.

Once the entire drum has been pushed out of the drum receiving portion, the lining may be clamped and then cut thus sealing the drum allowing the drum to be subsequently disposed of.

When it is required to insert a second drum into the glove box, the clamped end of the first lining may be pushed into the glove box, and a second drum may be positioned within a second lining which may be secured on the second groove by means of a retaining band. The second container may then be pushed into the glove box through the drum receiving portion pushing the end of the first lining into the glove box.

Preferably, a liner is attached to the outside of the outlet which liner may either be attached to a container for receiving the dispensed substance from the drum, or may be in the form of a closed tubular lining adapted to sealingly receive a substance dispensed from the drum.

Preferably, the flexible glove bag is removably attachable to the frame. This means that after a particular job has been completed, the glove bag may either be disposed of, or may be sterilised prior to being used on a subsequent job.

The invention will now be further described by way of example only with reference to the accompanying drawings in which.

Figures 1, 2:
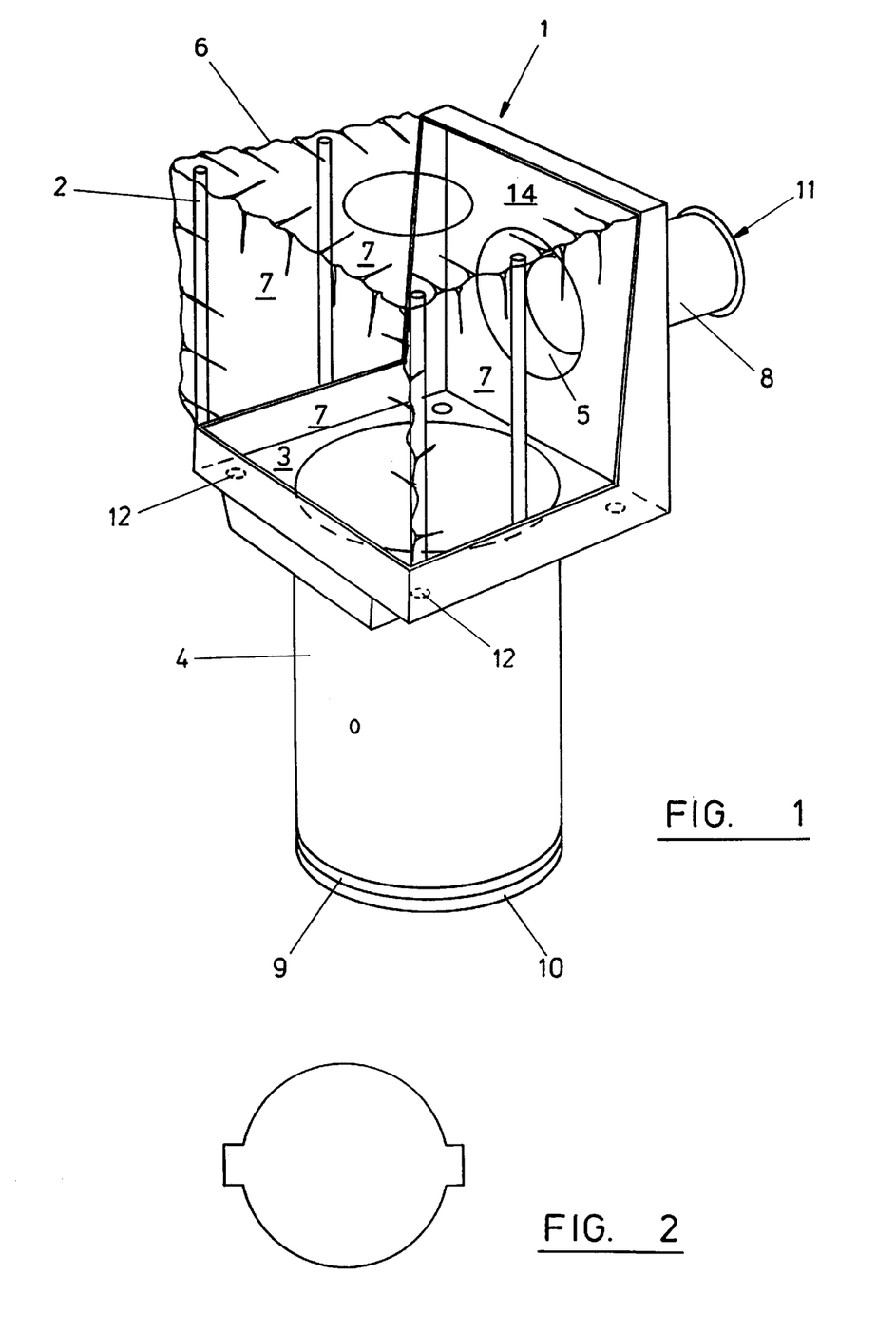
FIG. 1 is a schematic representation of an embodiment of a glove box according to the first aspect of the presents invention.
FIG. 2 is a schematic representation of the drum receiving portion of the glove box of FIG. 1.

Referring to FIG. 1, a glove box according to the present invention is designated generally by the reference numeral 1. The glove box comprises a rigid frame 2 made from, for example, stainless steel. The rigid frame defines the shape of the glove box which in this case is substantially cubic. The frame has a first solid face 3 defining a drum receiving portion 4 which is substantially tubular in shape. The frame has a second face 14 defining an outlet 5 also substantially tubular shape.

The remaining four faces of the frame are open, and a flexible glove bag 6 is shaped to fit over the frame covering the open faces 7 and to be sealingly attached to the frame 2. A sealing fit between the glove bag 6 and the frame 2 is effected by means of bolts which tightly secure the bag 6 to the frame 2.

The drum receiving portion comprises one or more grooves 9 formed on the outer surface of the tube towards the open end 10.

The diameter of the drum receiving portion 4 is shaped with contours to accommodate handles on the drum to be inserted into the drum receiving portion 4.

The end 11 of the outlet 8 is also formed with one or more grooves.

Prior to a drum being inserted into the drum receiving portion 4, a tubular liner is retained on groove 9 by means of a rubber retaining ring 42. The liner may be folded over onto itself in order that a long length of lining may be held in place by a groove 9 whilst not obscuring the open end 10 of the drum receiving portion.

The drum may have an inner lining which may be held in an open position once the lid of the drum has been removed by means of catches 12 which retain corners of the inner lining to allow access to the contents of the drum.

If the liner has a closed end, the drum which is to be inserted into the glove box 1 will be placed in the liner before the liner is secured to the groove 9. Alternatively, if the liner is open ended, the liner may be positioned around the drum once it has been retained in a groove 9 on the drum receiving portion. Its open end is then clamped such that the drum is completely enclosed within the liner.

Figure 3:
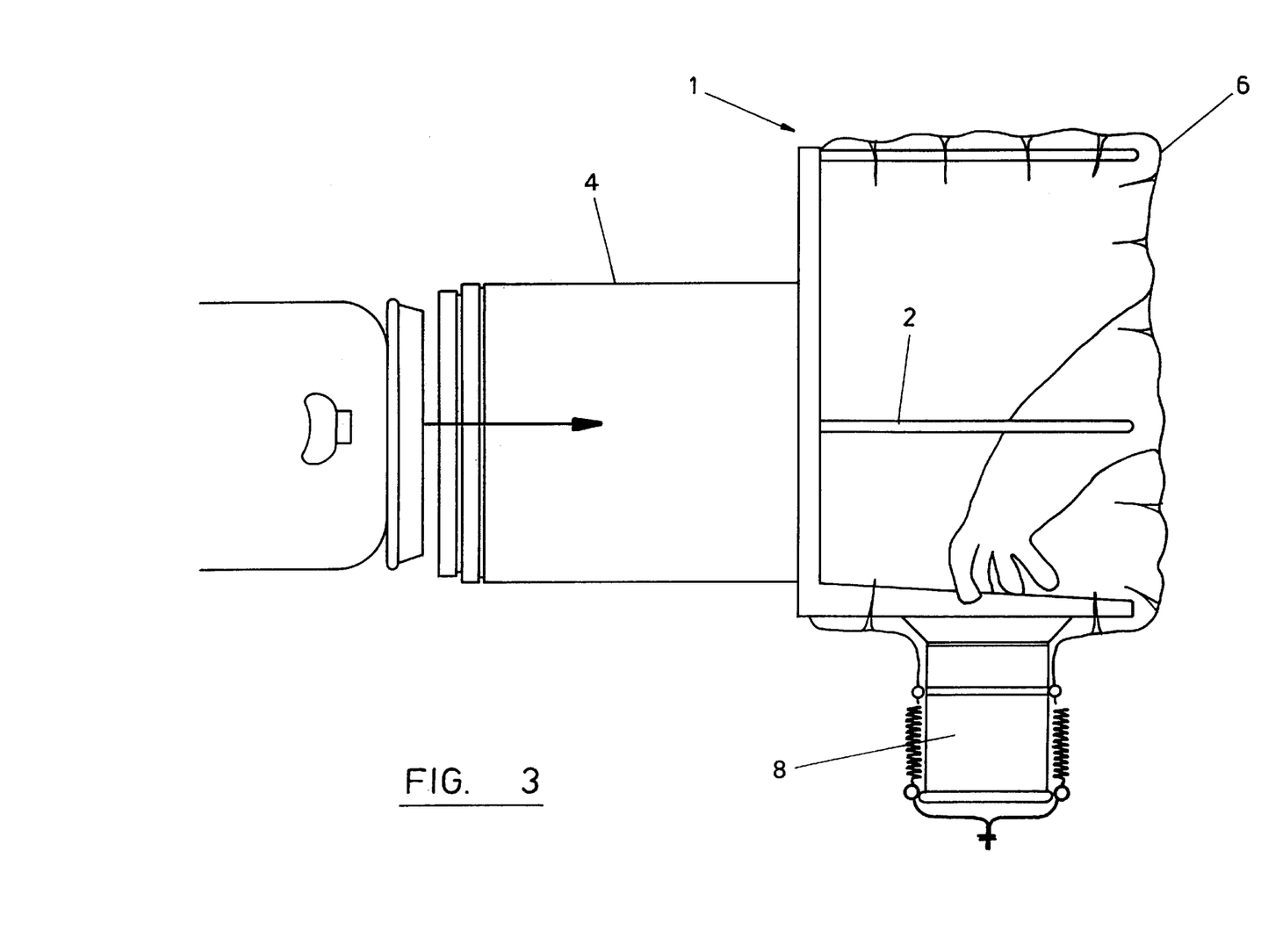
FIG. 3 is a schematic representation of the glove box of FIG. 1 showing loading of a drum.

The drum may then be inserted into the drum receiving portion 4 as shown in FIG. 3. The drum may be inserted into the drum receiving portion 4 whilst the glove box 1 is in the position in which the drum receiving portion is substantially horizontal.

Figure 4:
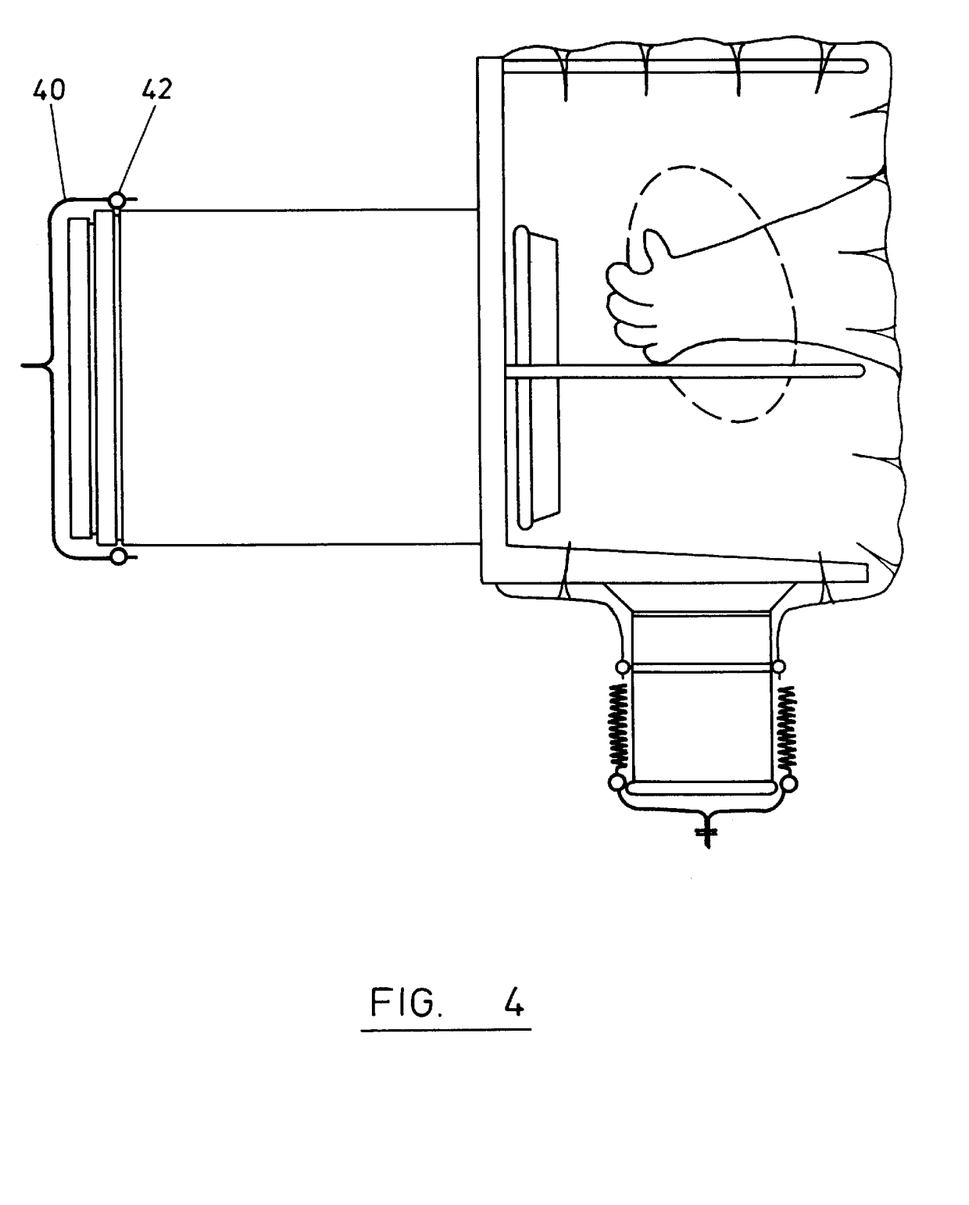
FIG. 4 is a schematic representation of the glove box of FIG. 1 showing the drum in place ready for removal of the lid.

The glove box 1 may then be rotated as shown in FIG. 4 such that the drum is in a horizontal position. The liner 40 extends around the end of the drum totally enclosing the drum.

Figure 5:
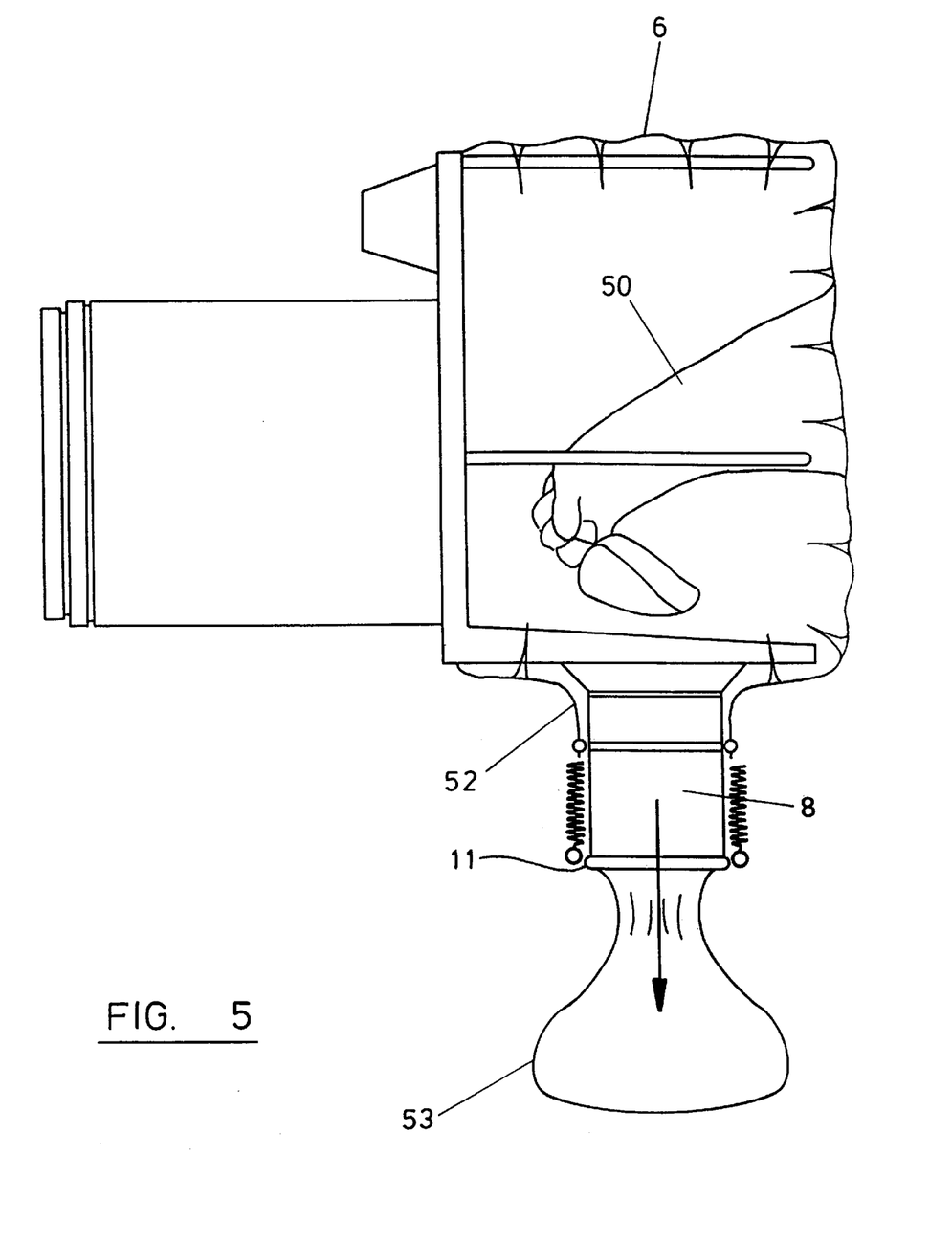
FIG. 5 is a schematic representation of the glove box of FIG. 1 showing a substance being dispensed from the drum.

An operator may now insert one or more of his hands into the gloves formed in the glove bag 6 and dispense the substance which may be in a powdered form from the drum to the outlet.

The outlet 8 is surrounded by a liner 52 held in place by the grooves 11 and forming a bag 53.

Figure 6:
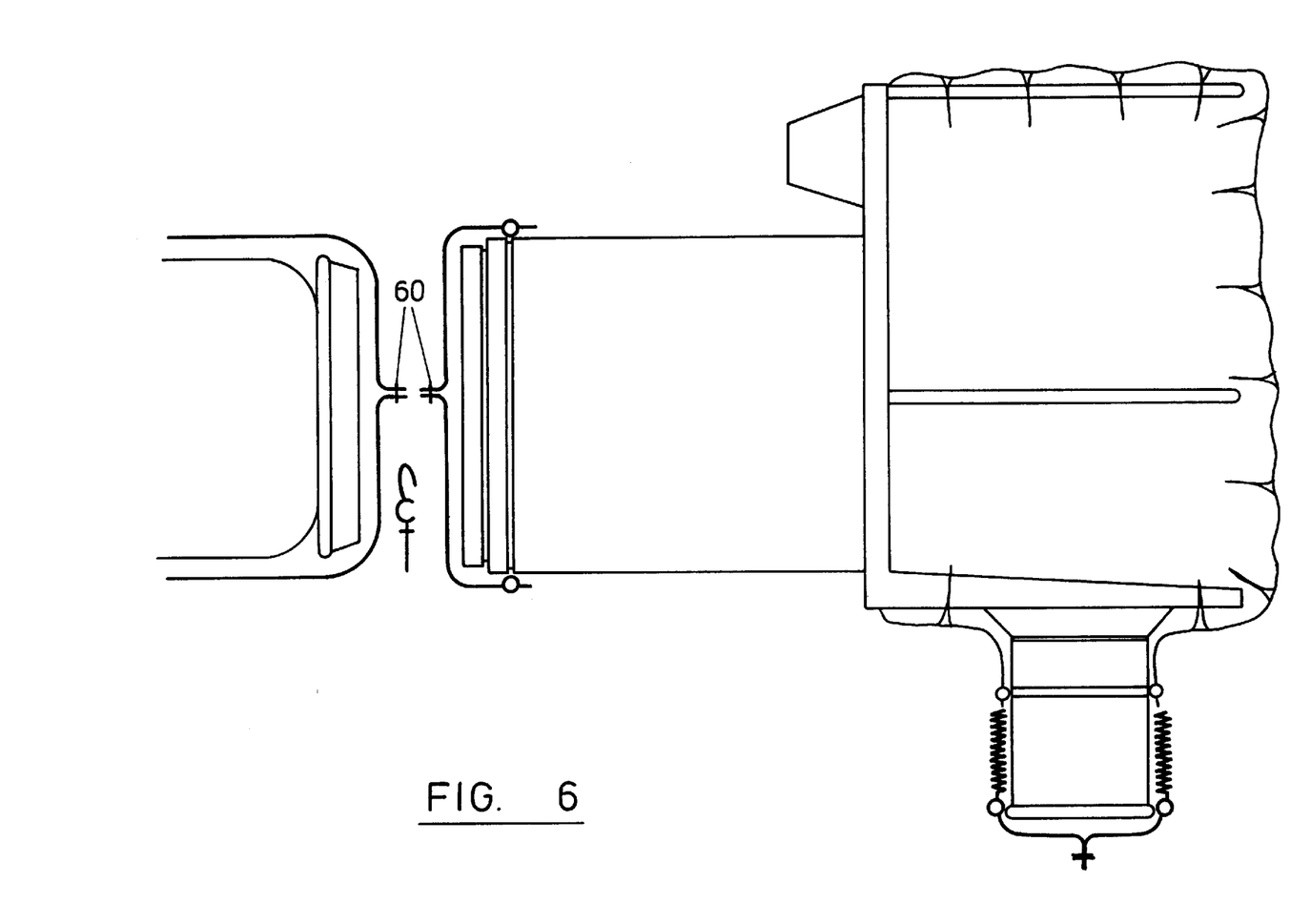
FIG. 6 is a schematic representation of the glove box of FIG. 1 showing removal of empty drum.

When all of the substance has been dispensed from the drum through the outlet into bag 53. The drum may be pushed out of the drum receiving portion 4 by the operator via the gloves in the glove bag 6. As the drum is pushed out of the drum receiving portion, the liner is unravelled due to the force exerted on the drum by the operator, and once the drum has been completely pushed out of the drum receiving portion, it is completely surrounded by lining. Throughout the unravelling process the liner is retained in groove 9 by means of band 42. The lining surrounding the drum may then be clamped with two clamps 60 and the length of liner between the clamps 60 may be cut. The drum is now totally enclosed within a sealed liner and may be appropriately disposed. The liner around the outlet may also be clamped in a similar manner allowing the substance within the bag 53 to be appropriately disposed of or otherwise used.

Figure 7:
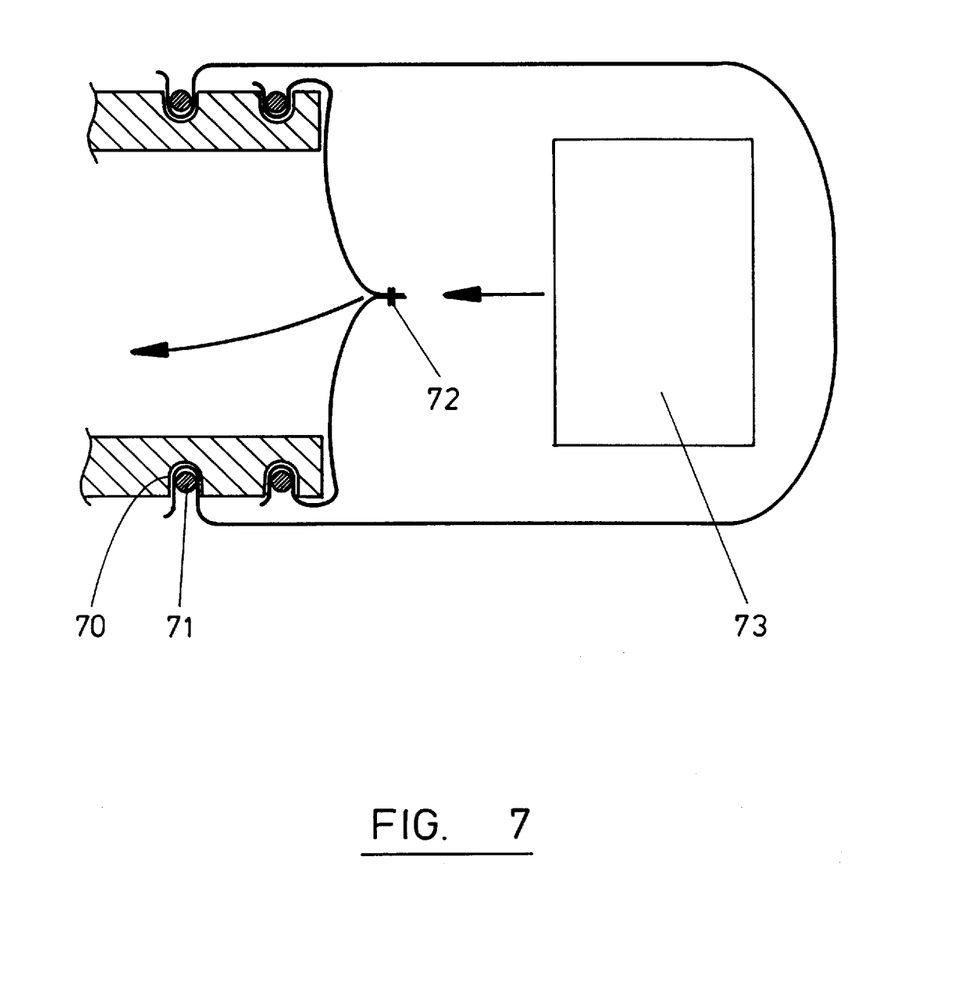
FIG. 7 is a schematic representation showing insertion of the second drum into the glove box.

If it is then required to dispense the substance from a second drum, the drum from which the substance is to be dispensed may be placed within a second liner having a closed end. The open end of the second liner may then be retained in place in a second groove 70 in conjunction with a retaining rubber band 71. The clamped end 72 is pushed into the glove box 1 which allows the second drum 73 to enter the glove box.

Eventual removal of the second drum 73 will take place using the similar steps to those described hereinabove with reference to the first drum.

I claim:

1. A glove box having a plurality of faces forming an interior for use in dispensing substances through said interior comprising:

a frame forming a major portion of only two of said faces of the glove box and a minor portion of a rest of said faces of the glove box, all of said portions being rigidly connected;

a flexible glove bag sealingly fitted over the frame and forming major portions of said rest of said faces of the glove box with said interior isolated from an exterior environment;

the frame further comprising a drum receiving portion and an outlet, the drum receiving portion comprising:

a tubular member extending from a surface of the glove box having an open end remote from the glove box and having a diameter compatible with the diameter of a drum to be attached to the glove box, the glove box further comprising an outer liner sealingly attached to an outside surface of the drum receiving portion, and which is adapted to entirely enclose said drum exteriorly to said glove box from which a substance is to be dispensed through said interior and out of said outlet and into a container, retaining means for retaining the liner in sealing contact with the drum receiving portion; and collection means sealingly attached to the outlet for collecting the substance from the drum after it has been dispensed.

2. A glove box according to claim 1 further comprising a drum sealingly connected to the drum receiving portion.

3. A glove box according to claim 1 in which the flexible glove bag incorporates one or more gloves.

4. A glove box according to claim 1 wherein the frame is made from a metal.

5. A glove box according to claim 1 wherein the glove bag is made from a plastic material.

6. A glove box according to claim 5 wherein the plastic material is transparent.

7. A glove box according to claim 1 wherein the glove box defines six faces, wherein the glove bag is shaped to fit over four of said faces of the glove box, the remaining two faces of the glove box being said two faces of which said frame forms major portions, said two faces defining the drum receiving portion and the outlet respectively.

8. A glove box according to claim 7 wherein the two remaining faces comprise sheets of metal.

9. A glove box according to claim 1 wherein the retaining means comprises one or more grooves formed in an outer surface of the drum receiving portion and positioned adjacent the open end of the drum receiving portion.

10. A glove box according to claim 1 wherein the drum receiving portion comprises two grooves extending circumferentially around the drum receiving portion.

11. A glove box according to claim 10 further comprising retaining bands positionable in each of the grooves.

12. A glove box according to claim 11 wherein the bands are formed from an elastics material.

13. A glove box according to claim 1 wherein the collection means is an additional liner attached to said outlet and either entirely encloses said container for receiving the dispensed substance from the drum or provides said container in the form of a closed tubular lining adapted to sealingly receive the substance dispensed from the drum.

14. A glove box as claimed in claim 1 wherein the flexible glove bag is removably attached to the frame.

15. A method of dispensing a substance contained within a said drum by means of a glove box according to claim 1.

* * * * *

UNITED STATES PATENT AND TRADEMARK OFFICE
CERTIFICATE OF CORRECTION

PATENT NO   : 5,890,781
DATED       : April 6, 1999
INVENTOR(S) : Ryder

It is certified that error appears in the above-identified patent and that said Letters Patent are hereby corrected as shown below:

In column 4, line 20, delete "11".

In column 4, line 55, changed "connected" to --interconnected--.

Signed and Sealed this

Eighth Day of February, 2000

Attest:

Q. TODD DICKINSON

Attesting Officer

Commissioner of Patents and Trademarks